US012662417B2

(12) United States Patent
Hung

(10) Patent No.: US 12,662,417 B2
(45) Date of Patent: Jun. 23, 2026

(54) GLASS METALLIZATION PROCESS FOR THROUGH GLASS VIAS WITH HIGH ASPECT RATIO

(71) Applicant: Taiwan Advanced Systems Corp., Zhubei City (TW)

(72) Inventor: Chun Hsiung Hung, Zhubei City (TW)

(73) Assignee: Taiwan Advanced Systems Corp., Zhubei City (TW)

( * ) Notice: Subject to any disclaimer, the term of this patent is extended or adjusted under 35 U.S.C. 154(b) by 163 days.

(21) Appl. No.: 18/768,229

(22) Filed: Jul. 10, 2024

(65) Prior Publication Data

US 2025/0346524 A1 Nov. 13, 2025

(30) Foreign Application Priority Data

May 10, 2024 (TW) ................................. 113117450

(51) Int. Cl.
*C03C 17/00* (2006.01)
*C03C 17/06* (2006.01)
*C03C 27/08* (2006.01)

(52) U.S. Cl.
CPC ............ *C03C 17/004* (2013.01); *C03C 17/06* (2013.01); *C03C 27/08* (2013.01); *C03C 2217/253* (2013.01); *C03C 2217/256* (2013.01); *C03C 2218/115* (2013.01); *C03C 2218/31* (2013.01)

(58) Field of Classification Search
CPC ................................. C03C 17/06; C03C 17/10
See application file for complete search history.

(56) References Cited

U.S. PATENT DOCUMENTS

| | | | |
|---|---|---|---|
| 2011/0147059 A1* | 6/2011 | Ma | H01L 23/49822 156/60 |
| 2021/0136915 A1* | 5/2021 | Frandsen | H05K 1/115 |
| 2023/0197620 A1* | 6/2023 | Strong | H01L 21/486 257/774 |
| 2024/0213116 A1* | 6/2024 | Arrington | H01L 23/5383 |
| 2025/0391717 A1* | 12/2025 | Wang | H10W 70/692 |

* cited by examiner

*Primary Examiner* — Austin Murata

(57) ABSTRACT

A glass metallization process for through glass vias with a high aspect ratio includes a single-sided coating step, a bonding step, a drilling step, a pre-lubricating step and a metallization step; or a drilling step, a single-sided coating step, a bonding step, a pre-lubricating step and a metallization step. Since the walls of the first and second glass substrates, the first and second seed layers and a bonding layer at the vias have undergone a pre-lubricating process, it is easy for the growth of the metal material during the electroplating process. Also, the metal material grows outward from a center of the stacked structure of the first and second glass substrates to completely fill the vias, thereby being able to be applied to vias with a higher aspect ratio without creating air gaps, making the electroplating process simpler and improving the electroplating yield.

33 Claims, 24 Drawing Sheets

GLASS METALLIZATION PROCESS FOR THROUGH GLASS VIAS WITH HIGH ASPECT RATIO

BACKGROUND OF THE INVENTION

1. Field of the Invention

The present invention relates generally to a metallization process, and more particularly, to a glass metallization process for through glass vias with high aspect ratio.

2. The Prior Arts

FIGS. 1-6 are schematic views of different process stages of a conventional glass metallization process. Please refer to FIGS. 1-5. The conventional glass metallization process includes the following process steps: a laser beam 200' is incident on a glass substrate 100' (as shown in FIG. 1); the laser beam 200' is directed to the glass substrate 100' performs laser modification (for example, structural modification) to form a pre-processing area (or "modified area") 300'; perform an etching process in the pre-processing area 300' (as shown in FIG. 2 shown), wherein the etching process may be a wet etching process using hydrofluoric acid (HF), but is not limited thereto; after the etching process, a via 400' is formed (as shown in FIG. 3); a sputtering process is performed to form a seed layer 500' to cover the surface of the glass substrate 100' and the wall surface 110' of the glass substrate 100' in the via 400' (as shown in FIG. 4); and an electroplating process is performed to form a conductive layer 600' covering the seed layer 500' (as shown in FIG. 5).

However, since the metal material such as copper in the electroplating process as shown in FIG. 5 grows from the upper end and the lower end of the via 400' toward the center of the via 400', if the aspect ratio of the via 400' is at least 8:1 (or 10:1, or 20:1), the speed at which the metal material forms the conductive layer 600' at the upper end and lower end of the via 400' is greater than that at the center of the via 400', so the upper and lower ends of the via 400' will soon be closed and the electroplating process cannot be performed at the center of the via 400', resulting in the formation of a package hole or air gap 700' (as shown in FIG. 6), resulting in difficulty in plating execution, low plating yield and low product electrical properties.

SUMMARY OF THE INVENTION

A primary objective of the present invention is to provide a glass metallization process for through glass vias with high aspect ratio. Since each wall surface at the via in the first glass substrate, the first seed layer, the lamination layer, the second seed layer and the second glass substrate undergoes a pre-lubricating process to facilitate the growth of the metal material during the electroplating process, and the metal material grows from the first seed layer at the center of the via toward the surface of the first glass substrate opposite to the first seed layer to fill the lower part and the center of the via, and at the same time, the metal material is grown from the second seed layer at the center of the via toward the surface of the second glass substrate opposite to the second seed layer to fill the upper part and the center of the via. Or, the metal material is grown from the first via adjacent to the first seed layer toward the surface of the first glass substrate opposite to the first seed layer to completely fill the first via, and at the same time, the metal material is grown from the second via adjacent to the second seed layer toward the surface of the second glass substrate opposite to the second seed layer to completely fill the second via. Therefore, the metal material can completely fill the via, which can be applied to applications with via with a high aspect ratio and does not produce air gap as in the conventional method, thereby simplifying the electroplating process and improving the electroplating yield.

Yet another objective of the present invention is to provide a glass metallization process for through glass vias with high aspect ratio, which uses a stack of two glass substrates (i.e., a first glass substrate and a second glass substrate), therefore, the supporting force of the overall structure can be increased and the breakage of individual glass substrates is avoided to affect the yield rate.

Another objective of the present invention is to provide a glass metallization process for through glass vias with high aspect ratio. Compared with the conventional technology, the plating speed can be increased by at least 200 times, the production speed is accelerated. By stacking two glass substrates for production and using electroplating equipment with two sets of anodes for electroplating, it is possible to produce two metallized glass substrates with through-glass vias (TGVs) at the same time to improve productivity.

Another objective of the present invention is to provide a glass metallization process for through glass vias with high aspect ratio. Since the metal material grows from the center of the via to both ends, instead of growing on the surface of the glass substrate as in the conventional technology, so there is no problem of cracking or damage to the glass substrate caused by different thermal expansion coefficients, thus improving the yield rate.

To achieve the aforementioned objectives, the present invention provides a glass metallization process for through glass vias with high aspect ratio, including: a single-sided coating step: forming a first seed layer on a surface of a first glass substrate and forming a second seed layer on a surface of a second glass substrate; a bonding step: turning over the second glass substrate and bonding the first seed layer and the second seed layer through a bonding layer; a drilling step: forming at least one via to penetrate the second glass substrate, the second seed layer, the bonding layer, the first seed layer, and the first glass substrate; a pre-lubricating step: performing a pre-lubricating process on the first glass substrate, the first seed layer, the bonding layer, the second seed layer and the second glass substrate; and a metallization step: using a metal material to perform an electroplating process, so that the metal material grows from the first seed layer at a center of the at least one via toward a surface of the first glass substrate opposite to the first seed layer to fill a lower part of the at least one via and the center, and at the same time, the metal material grows from the second seed layer at the center of the at least one via toward a surface of the second glass substrate opposite to the second seed layer to fill an upper part of the via and the center; wherein the upper part corresponds to the second glass substrate, the lower part corresponds to the first glass substrate, and the center corresponds to the second seed layer, the bonding layer and the first seed layer.

In some embodiments, the pre-lubricating process in the pre-lubricating step includes placing the first glass substrate, the first seed layer, the bonding layer, the second seed layer and the second glass substrate simultaneously into a holding tank; introducing carbon dioxide the holding tank to fill the at least one via with carbon dioxide; and introducing water liquid into the holding tank, wherein the water liquid reacts with carbon dioxide to produce carbonic acid, so that the at least one via is filled with carbon dioxide and the first glass substrate, the first seed layer, the bonding layer, the second seed layer and the second glass substrate become wet on each wall surface of the at least one via.

In some embodiments, the single-sided coating step further includes: depositing a first extension part of the first seed layer partially covering each outer side wall of the first glass substrate, and depositing a second extension part of the second seed layer partially covering each outer side wall of the second glass substrate.

In some embodiments, the material of the first seed layer and the second seed layer is copper (Cu) or silver (Ag).

In some embodiments, the material of the bonding layer is an energy-removable material, and the energy-removable material at least includes a photonic decomposable material and a thermal decomposable material.

In some embodiments, the bonding layer is an adhesive with weak lateral bonding, or a low-melting-point metal, wherein the low-melting-point metal has a melting point lower than 350° C.

In some embodiments, an aspect ratio of the at least one via is between 5:1 and 25:1.

In some embodiments, a diameter of the at least one via is between 20 μm and 150 μm.

In some embodiments, in the metallization step, after performing the electroplating process, the metal material forms a first bump on the surface of the first glass substrate opposite to the first seed layer, and the metal material forms a second bump on the surface of the second glass substrate opposite to the second seed layer; and a planarization process is performed to remove the first bump and the second bump.

In some embodiments, the planarization process includes a grinding process or a polishing process.

In some embodiments, the planarization process includes chemical-mechanical polishing process.

In some embodiments, the bonding step further includes forming a conductive layer to cover the first extension part and the second extension part.

In some embodiments, the single-sided coating step is implemented through a sputtering process.

In some embodiments, the bonding layer in the bonding step is formed over the first seed layer through a sputtering process.

In some embodiments, the drilling step includes: using a laser beam to vertically illuminate the second glass substrate, the second seed layer, the bonding layer, the first seed layer and the first glass in sequence; the substrate is modified to form a pre-processing area; and an etching process is performed in the pre-processing area to form the via.

In some embodiments, the bonding step includes: forming the bonding layer on the first seed layer; and flipping the second glass substrate to bond the second seed layer on the bonding layer.

To achieve the aforementioned objectives, the present invention provides a glass metallization process for through glass vias with high aspect ratio, including: a drilling step: forming at least a first via to penetrate a first glass substrate, and forming at least a second via to penetrate a second glass substrate; a single-sided coating step: forming a first seed layer on a surface of the first glass substrate without covering the at least one first via; and forming a second seed layer on a surface of the second glass substrate without covering the at least one second via; a bonding step: turning over the second glass substrate and bonding with the first seed layer through a bonding layer; a pre-lubricating step: performing a pre-lubricating process on the first glass substrate, the first seed layer, the bonding layer, the second seed layer, and the second glass plate; and a metallization process: using a metal material to perform an electroplating process, so that the metal material grows from the at least one first via adjacent to the first seed layer toward a surface of the first glass substrate opposite to the first seed layer to completely fill the at least one first via, and at the same time, the metal material grows from the at least one second via adjacent to the second seed layer toward a surface of the second glass substrate opposite to the second seed layer to completely fill the at least one second via.

In some embodiments, the pre-lubricating process in the pre-lubricating step includes placing the first glass substrate, the first seed layer, the bonding layer, the second seed layer, and the second glass substrate simultaneously into a holding tank; introducing carbon dioxide into the holding tank so that the at least one first via and the at least one second via being filled with carbon dioxide; and introducing water into the holding tank, wherein the water reacting with carbon dioxide to generate carbonic acid, so that the first glass substrate, the first seed layer, the bonding layer, the second seed layer, and the second glass substrate becoming wet on each wall surface of the at least one via and the at least one second via.

In some embodiments, the single-sided coating step further includes: a first extension part of the first seed layer partially covering each outer side wall of the first glass substrate, and a second extension part of the second seed layer partially covering each outer side wall of the second glass substrate.

In some embodiments, the material of the first seed layer and the second seed layer is copper (Cu) or silver (Ag).

In some embodiments, the material of the bonding layer is an energy-removable material, and the energy-removable material at least includes a photonic decomposable material and a thermal decomposable material.

In some embodiments, the bonding layer is an adhesive with weak lateral bonding, or a low-melting-point metal, wherein the low-melting-point metal has a melting point lower than 350° C.

In some embodiments, an aspect ratio of the at least one first via and the at least one second via is between 5:1 and 25:1.

In some embodiments, a diameter of the at least one first via and the at least one second via is between 20 μm and 150 μm.

In some embodiments, the bonding step further includes forming a conductive layer to cover the first extension part and the second extension part.

In some embodiments, the single-sided coating step is implemented through a sputtering process.

In some embodiments, the bonding layer in the bonding step is formed over the first seed layer through a sputtering process.

In some embodiments, the drilling step includes: using a laser beam to vertically illuminate the first glass substrate and the second glass substrate respectively to modify the glass substrates to form at least one first pre-processing area (or the first modified area) and at least one second pre-processing area (or the second modified area); and performing an etching process in the at least one first pre-processing area and the at least one second pre-processing area respectively to form the at least one first via and the at least one second via.

In some embodiments, the bonding step includes: forming the bonding layer on the first seed layer; and flipping the second glass substrate to bond the second seed layer on the bonding layer.

In some embodiments, in the metallization step, after performing the electroplating process, the metal material forms a first bump on the surface of the first glass substrate opposite to the first seed layer, and the metal material forms a second bump on the surface of the second glass substrate opposite to the second seed layer; and a planarization process is performed to remove the first bump and the second bump.

In some embodiments, the planarization process includes a grinding process or a polishing process.

In some embodiments, the planarization process includes a chemical-mechanical polishing process.

In some embodiments, in the bonding step, the at least one first via is arranged correspondingly to match the at least one second via.

BRIEF DESCRIPTION OF THE DRAWINGS

The present invention will be apparent to those skilled in the art by reading the following detailed description of a preferred embodiment thereof, with reference to the attached drawings, in which.

DETAILED DESCRIPTION OF THE PREFERRED EMBODIMENT

The accompanying drawings are included to provide a further understanding of the invention, and are incorporated in and constitute a part of this specification. The drawings illustrate embodiments of the invention and, together with the description, serve to explain the principles of the invention.

In addition, the terms "comprising" and/or "comprising" refer to the presence of stated features, regions, integers, steps, operations, elements and/or parts, but do not exclude the presence of one or more other features, regions, integers, The presence or addition of steps, operations, elements, parts and/or combinations thereof.

Figure 1:
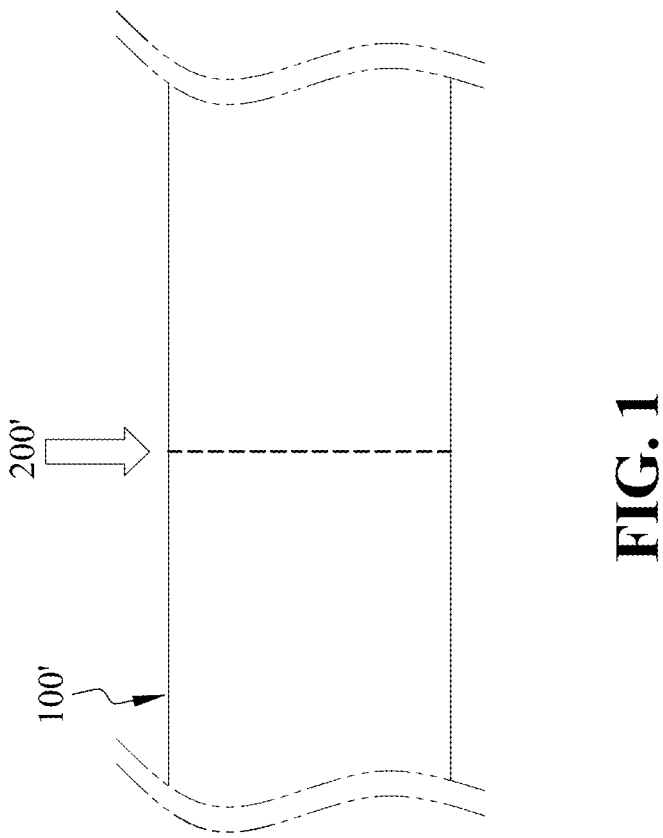
FIGS. 1 to 6 are schematic views of different process stages of a conventional glass metallization process.
Figure 2:
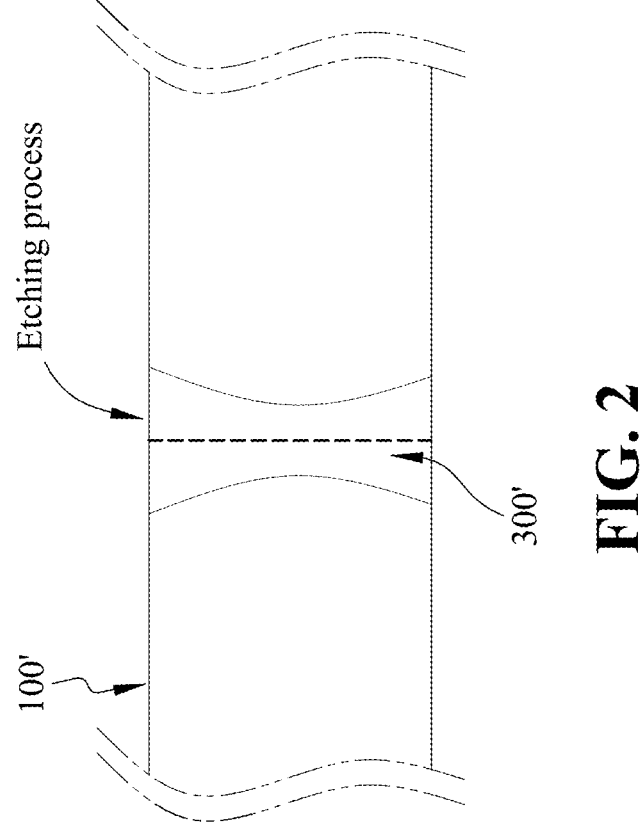
Figure 3:
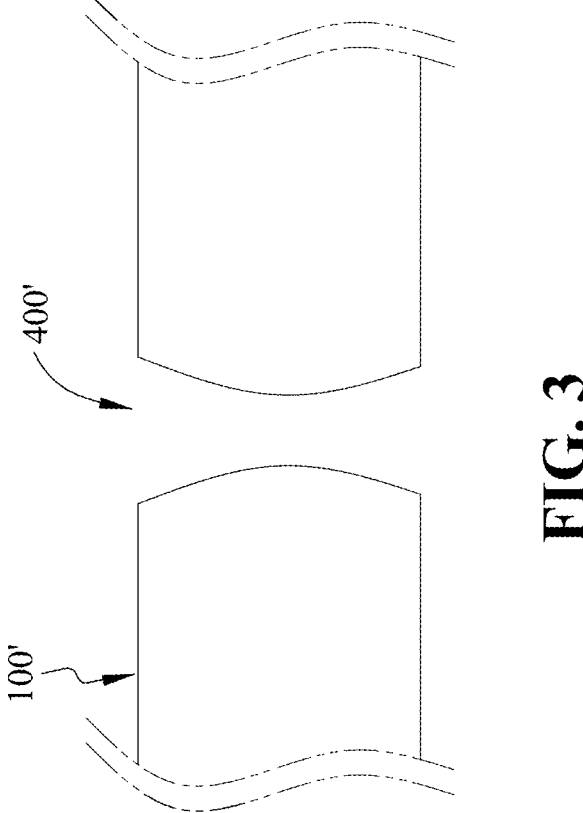
Figure 4:
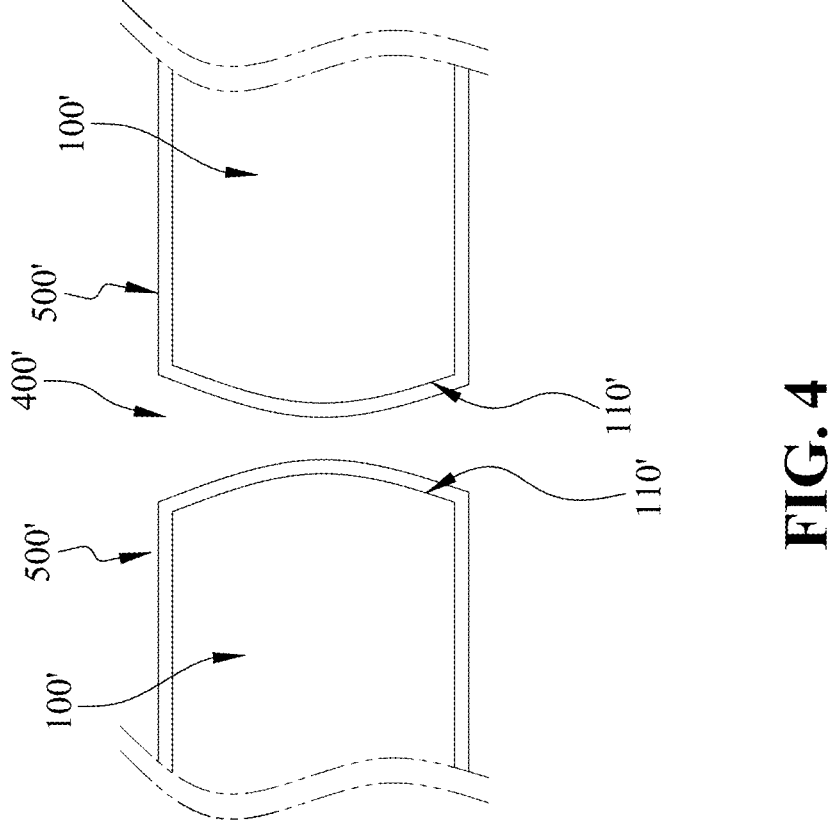
Figure 5:
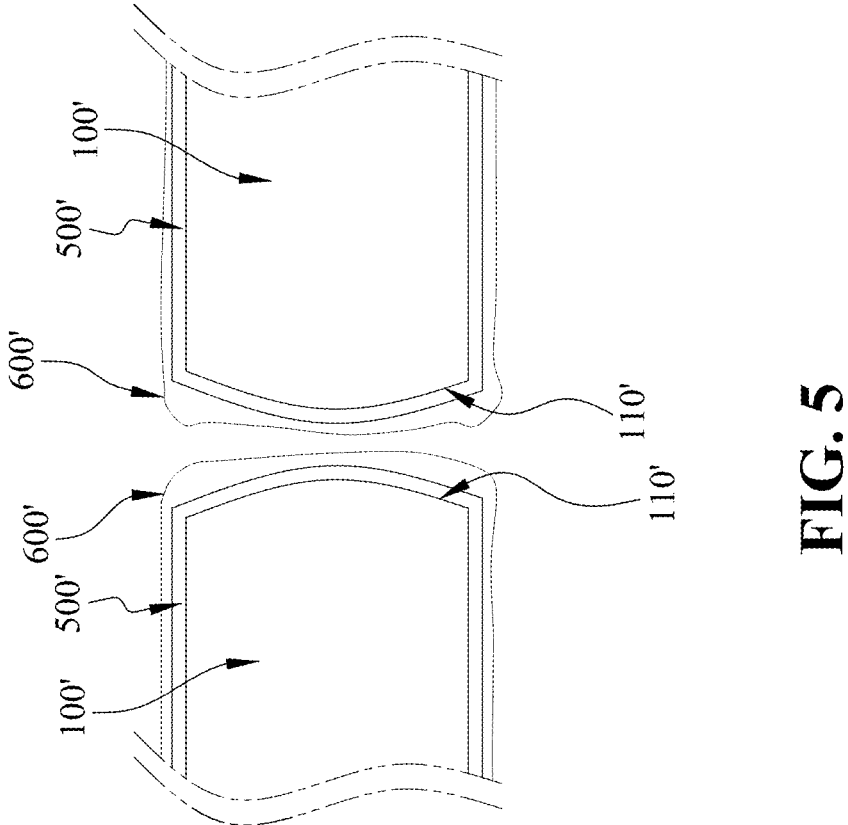
Figure 6:
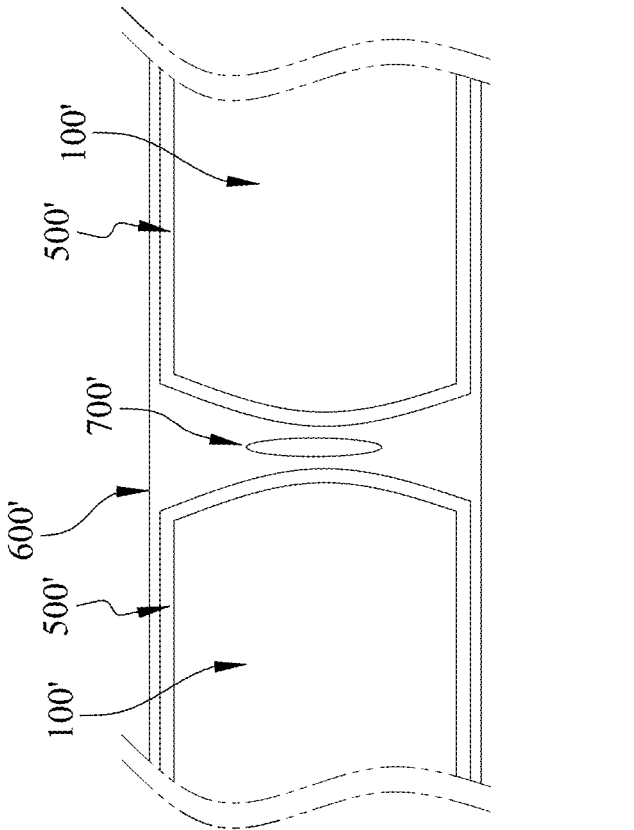
Figure 7:
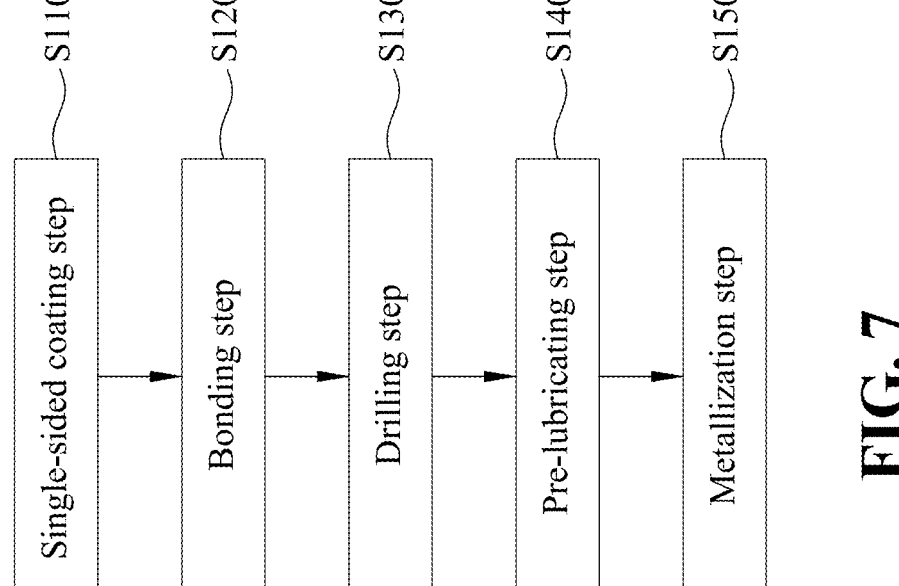
FIG. 7 is a schematic flowchart of the first embodiment of the glass metallization process for through glass vias with high aspect ratio according to the present invention.

FIG. 7 is a schematic flowchart of a first embodiment of a glass metallization process for through glass vias with high aspect ratio according to the present invention. FIGS. 8 to 17 are schematic views of different process stages of the glass metallization process for through glass vias with high aspect ratio according to the first embodiment of the present invention.

Refer to FIG. 7 and FIG. 8 to FIG. 17. The glass metallization process S100 for through glass vias with high aspect ratio according to the first embodiment of the present invention includes the following steps. In the following description, one via is taken as an example, but the number may be more than one, including multiple.

Figure 8:
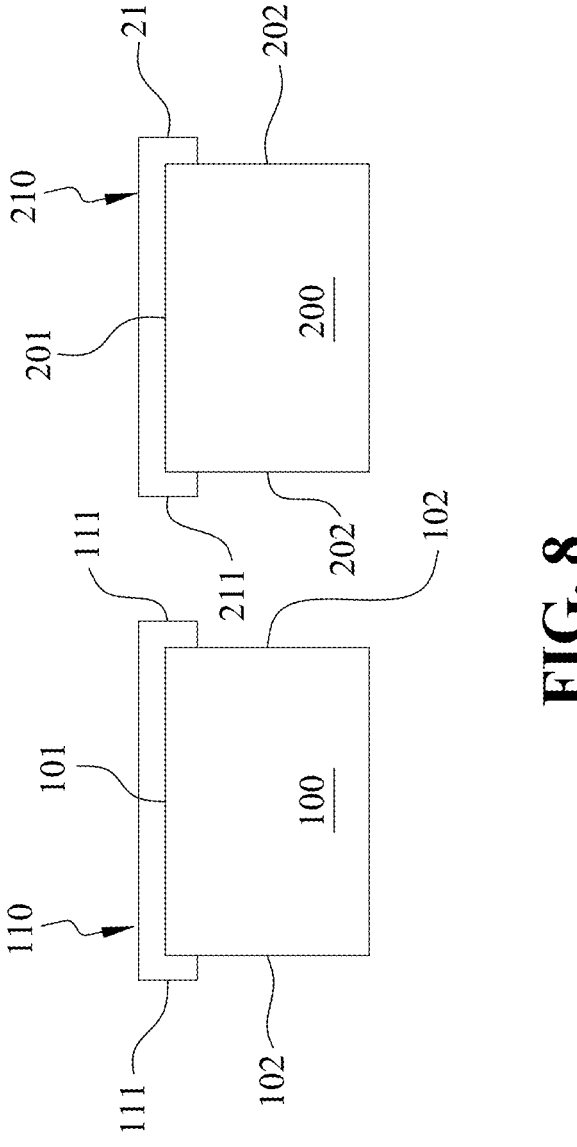
FIGS. 8 to 15 are schematic views of different process stages of the first embodiment of the glass metallization process for through glass vias with high aspect ratio according to the present invention.

Step S110 is a single-sided coating step, that is, forming a first seed layer on a surface of a first glass substrate and forming a second seed layer on a surface of a second glass substrate. In some embodiments, as shown in FIG. 8, the first seed layer 110 is formed on the surface 101 (e.g., upper surface) of the first glass substrate 100, and the second seed layer 210 is formed on the surface 201 (e.g., upper surface) of the second glass substrate 200. In some embodiments, the first seed layer 110 may be formed on the surface 101 of the first glass substrate 100 through a sputtering process, but is not limited thereto. In some embodiments, the second seed layer 210 can be formed on the surface 201 of the second glass substrate 200 through a sputtering process, but is not limited thereto.

In some embodiments, the single-sided coating step (i.e., step S110) may also include: depositing a first extension part of the first seed layer partially covers each outer side wall of the first glass substrate, and depositing a second extension part of the second seed layer partially covers each outer side wall of the second glass substrate. In some embodiments, the first extension part 111 of the first seed layer 110 partially covers each outer side wall 102 of the first glass substrate 100, and the second extension part 211 of the second seed layer 210 partially covers each outer side wall 202 of the second glass substrate 200. In some embodiments, preferably, the material of the seed layer 110 and the seed layer 210 may be copper (Cu) or silver (Ag), but is not limited thereto.

Figure 9:
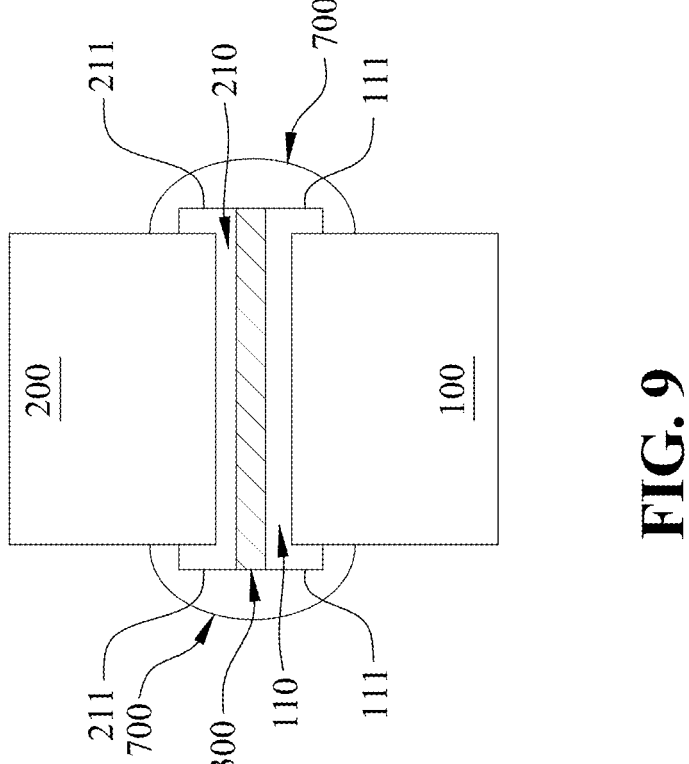

Step S120 is a bonding step, that is, turning over the second glass substrate and bonding the first seed layer and the second seed layer through a bonding layer. In some embodiments, as shown in FIG. 9, the second glass substrate 200 is turned over, and then the first seed layer 110 and the second seed layer 210 are bonded through the bonding layer 300. In some embodiments, the bonding step (i.e., step S120) includes: forming the bonding layer over the first seed layer; and turning the second glass substrate over to bond the second seed layer over the bonding layer. In some embodiments, bonding layer 300 is formed over the first seed layer 110. Alternatively, the bonding layer 300 may be formed over the second seed layer 210. The present invention takes the bonding layer 300 formed on the first seed layer 110 as an example. As long as the bonding layer 300 can be used to bond the first seed layer 110 of the first glass substrate 100 and the second seed layer 210 of the second glass substrate 200 to each other. In some embodiments, the material of the bonding layer 300 may be an energy removable material, and the energy removable material at least includes a photonic decomposable material and a thermal decomposable material. In some embodiments, preferably, the bonding layer 300 can be an adhesive with weak lateral bonding, so that after the final via metallization is completed, the bonding layer 300 can be laterally destroyed through a tool (not shown) to be removed from the bonding layer 300, so that the first seed layer 110 of the first glass substrate 100 and the second seed layer 210 of the second glass substrate 200 can be peeled off from each other. Or, in other embodiments, the bonding layer 300 can be a low-melting-point metal, such as tin (melting point is about 260° C.). In this case, the first glass substrate 100 and the second glass substrate 200 can be bonded at 250° C. The bonded first glass substrate 100 and the second glass substrate 200 may also be peeled off at 250° C. In some embodiments, when the bonding layer 300 is a low-melting-point metal, the melting point of the low-melting-point metal may be lower than 350° C.

Figure 10:
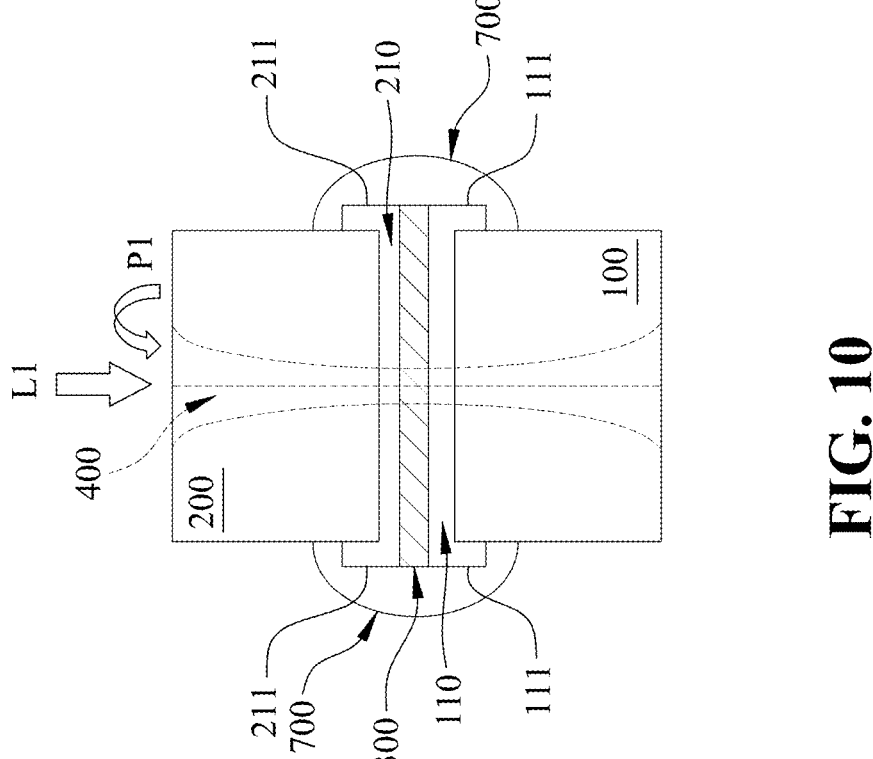
Figure 11:
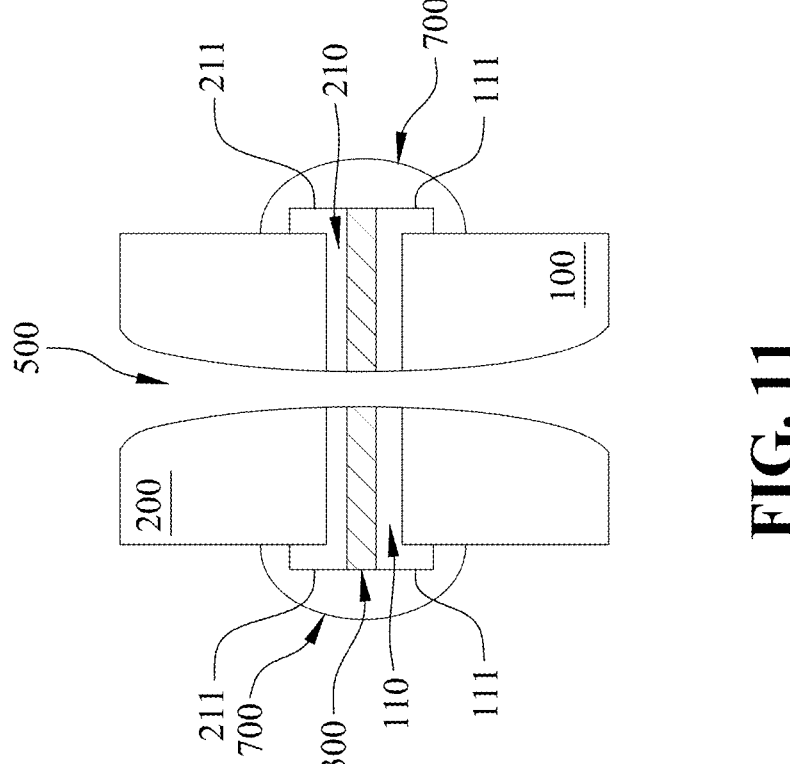

Step S130 is a drilling step, that is, forming at least one via to penetrate the second glass substrate, the second seed layer, the bonding layer, the first seed layer and the first glass substrate. In some embodiments, the drilling step (step S130) may include: sequentially vertically incident a laser beam on the second glass substrate, the second seed layer, the bonding layer, the first seed layer and the first glass substrate to perform structural modification to form at least one pre-processing area (or modified area); and an etching process is performed in the at least one pre-processing area to form the at least one via. In some embodiments, as shown in FIG. 10, the laser beam L1 is vertically incident on the second glass substrate 200, the second seed layer 210, the bonding layer 300, the first seed layer 110, and the first glass substrate 100 in sequence to destroy the materials and structures of the second glass substrates 200, the second seed layer 210, the bonding layer 300, the first seed layer 110, and the first glass substrate 100 to form the pre-processing area 400 (this embodiment uses a single pre-processing area as an example for illustration, but not limited thereto). In some embodiments, as shown in FIG. 11, an etching process P1 is performed in the pre-processing area 400 to form the via 500. In some embodiments, the etching process P1 may be a dry etching process, a wet etching process, or a combination thereof. If the etching process P1 is a wet etching process, it can be realized through hydrofluoric acid (HF). In some embodiments, an aspect ratio of the via 500 may range from 5:1 to 25:1. In some embodiments, the via 500 may have a diameter ranging from 20 μm to 150 μm.

In some embodiments, the via 500 includes an upper part 510, a lower part 520, and a center 530 that are connected to one another. The upper part 510 corresponds to the second glass substrate 200, the lower part 520 corresponds to the first glass substrate 100, and the center 530 corresponds to the second seed layer 210, the bonding layer 300, and the second seed layer 110.

Figure 12:
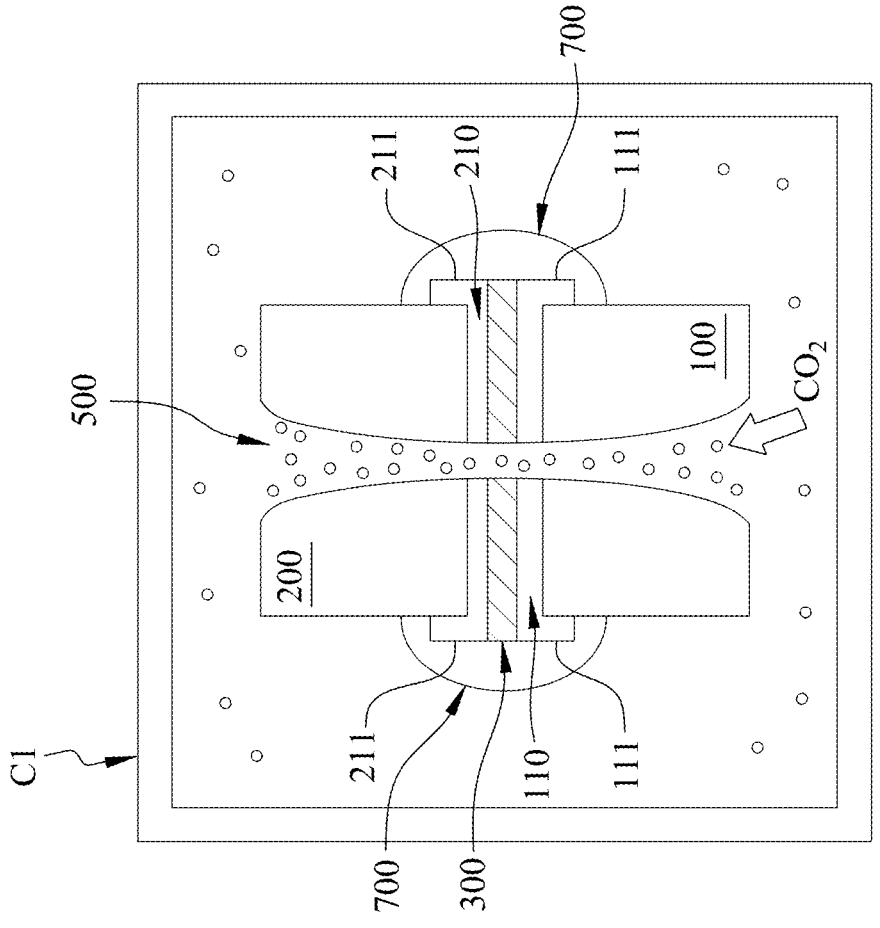
Figure 13:
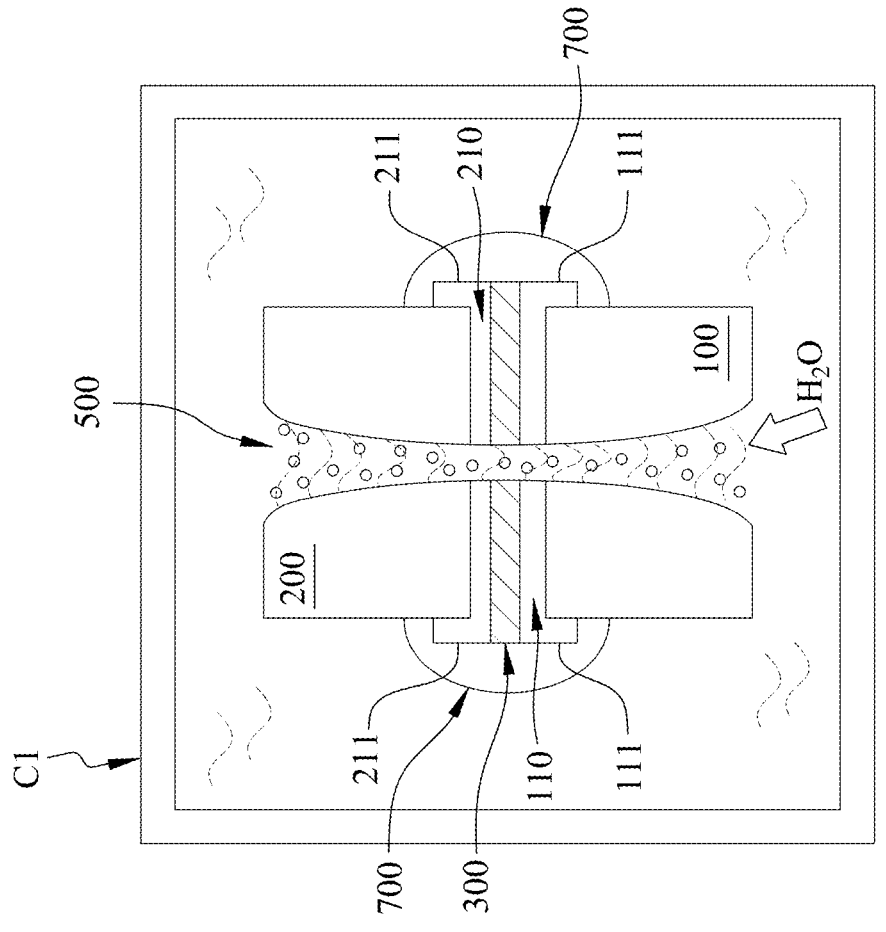

Step S140 is a pre-lubricating step, that is, a pre-lubricating process is performed on the first glass substrate, the first seed layer, the bonding layer, the second seed layer, and the second glass substrate. In some embodiments, as shown in FIGS. 12 and 13, the pre-lubricating process includes: placing the first glass substrate, the first seed layer, the bonding layer, the second seed layer, and the second glass substrate into a holding tank; carbon dioxide is the introduced into the holding tank so that at least one via is filled with carbon dioxide; and then water is introduced into the holding tank, wherein the water reacts with carbon dioxide to produce carbonic acid, so that the at least one via is filled with carbonic acid. That is, each wall surface of the first glass substrate, the first seed layer, the bonding layer, the second seed layer, and the second glass substrate at the at least one via becomes wet. In some embodiments, as shown in FIG. 12, the pre-lubricating process includes placing the first glass substrate 100, the first seed layer 110, the bonding layer 300, the second seed layer 210, and the second glass substrate 200 into a holding tank C1, and carbon dioxide (i.e., $CO_2$) is introduced into the holding tank C1, so that the via 500 is filled with carbon dioxide. In some embodiments, as shown in FIG. 13, water (i.e., $H_2O$) is introduced into the holding tank C1, wherein the water reacts with carbon dioxide to produce carbonic acid (i.e., $H_2CO_3$). The walls of the first glass substrate 100, the first seed layer 110, the bonding layer 300, the second seed layer 210, and the second glass substrate 200 at the via 500 are made moist, thereby facilitating the growth of the metal material in the subsequent electroplating process.

Figure 14:
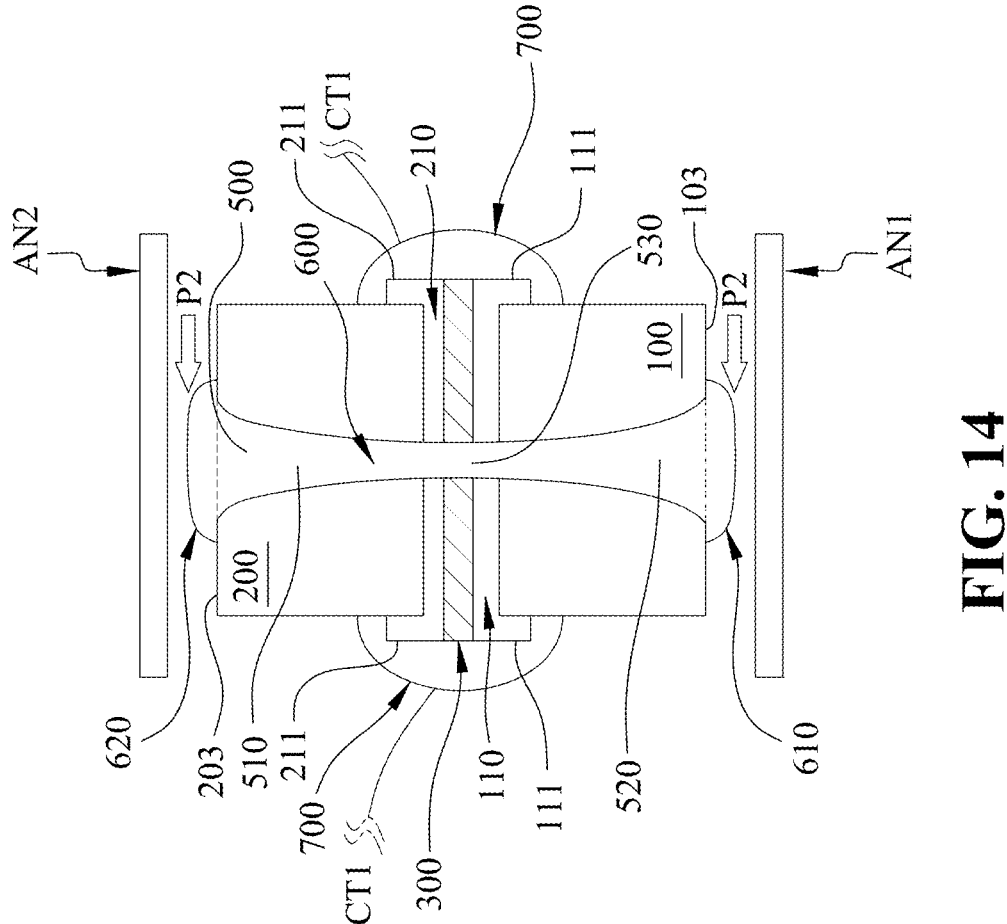
Figure 15:
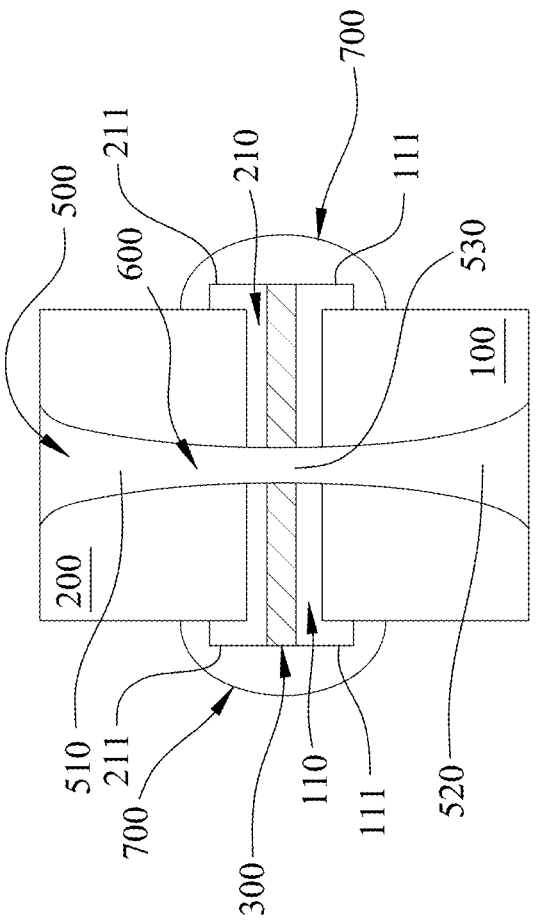

Step S150 is a metallization step, that is, using a metal material to perform an electroplating process, so that the metal material grows from the first seed layer at a center of the at least one via toward a surface of the first glass substrate opposite to the first seed layer to fill a lower part of the at least one via and the center, and at the same time, the metal material grows from the second seed layer at the center of the at least one via toward a surface of the second glass substrate opposite to the second seed layer to fill an upper part of the via and the center. In some embodiments, as shown in FIGS. 14 and 15, the anodes AN1 and AN2 of the electroplating equipment (not shown) are respectively disposed above the second glass substrate 200 and below the first glass substrate 100 in step S140, and the cathode CT1 of the electroplating equipment (not shown) can be electrically connected to the first seed layer 110 and the second seed layer 210 at the same time. Therefore, when using the metal material 600 to perform an electroplating process, the anodes AN1 and AN2 of the electroplating equipment (not shown) are started at the same time, so that the metal material 600 grows from the first seed layer 110 at the center 530 of the via 500 toward a surface 103 (e.g., the lower surface) of the first glass substrate 100 opposite to the first seed layer 110 to fill the lower part 520 and the center 530 of the via 500, and at the same time, the metal material 600 grows from the second seed layer 210 at the center 530 of the via 500 toward a surface 203 of the second glass substrate 200 opposite to the second seed layer 210 (e.g., the lower surface as seen in FIGS. 12 and 13) to fill the upper part 510 and center 530 of the via 500.

In some embodiments, in order to enable the cathode CT1 of the electroplating equipment (not shown) to electrically connect the first seed layer 110 and the second seed layer 210 at the same time, the bonding step (i.e., step S120) may also include: forming a conductive layer to cover the first extension part and the second extension part. In some embodiments, the conductive layer 700 is formed to cover the first extension part 111 and the second extension part 211. That is, the cathode CT1 of the electroplating equipment (not shown) can penetrate the conductive layer 700 and electrically connect the first seed layer 110 and the second seed layer 210 at the same time. In some embodiments, the conductive layer 700 may be made of copper glue, but is not limited thereto.

The metallization step (i.e., step S150), after performing the electroplating process, further includes: the metal material forms a first bump on the surface of the first glass substrate opposite to the first seed layer, and the metal material forms a second bump on the surface of the second glass substrate opposite to the second seed layer; and a planarization process is performed to remove the first bump and the second bump. That is, in some embodiments, as shown in FIG. 14, the metal material 600 forms the first bumps 610 on the surface 103 of the first glass substrate 100 opposite to the first seed layer 110, and the metal material 600 forms the second bump 620 opposite to the surface 203 of the second seed layer 210; and the first bump 610 and the second bump 620 are removed by performing a planarization process P2. In some embodiments, the planarization process P2 includes a grinding process or a polishing process. In some embodiments, preferably, the planarization process P2 includes a chemical-mechanical polishing process.

Finally, after the metallization step (i.e., step S150), if the bonding layer 300 is an energy-removable material, the bonding layer 300 can be irradiated with a beam of energy, such as light, heat and other energy, so that the bonding layer 300 can be decomposed and exert a relative shearing force on the first glass substrate 100 and the second glass substrate 200. The first glass substrate 100 and the second glass substrate 200 can be displaced by about 1 mm from each other, and then the metal material between the first seed layer 110 and the second glass substrate 200 is cut off so that the first glass substrate 100 and the second glass substrate 200 can be peeled off from each other; or, if the bonding layer 300 is an adhesive with weak lateral bonding, it can be removed through a tool (not shown). The bonding layer 300 can be damaged from the side, and a relative shearing force is exerted on the first glass substrate 100 and the second glass substrate 200. The first glass substrate 100 and the second glass substrate 200 can be displaced from each other by about 1 mm, and then the metal material between the first seed layer 110 and the second seed layer 210 is cut so that the first glass substrate 100 and the second glass substrate 200 can be peeled off from each other.

Figure 16:
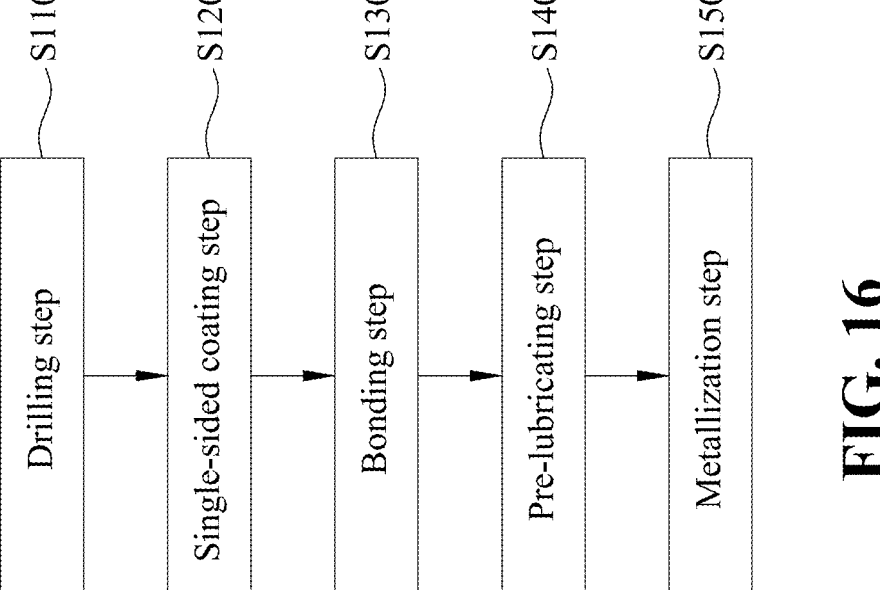
FIG. 16 is a schematic flowchart of a second embodiment of the glass metallization process for through glass vias with high aspect ratio according to the present invention.

FIG. 16 is a schematic flowchart of a second embodiment of a glass metallization process for through glass vias with high aspect ratio according to the present invention. FIGS. 17 to 24 are schematic views of different process stages of the glass metallization process for through glass vias with high aspect ratio according to the second embodiment of the present invention.

Figure 17:
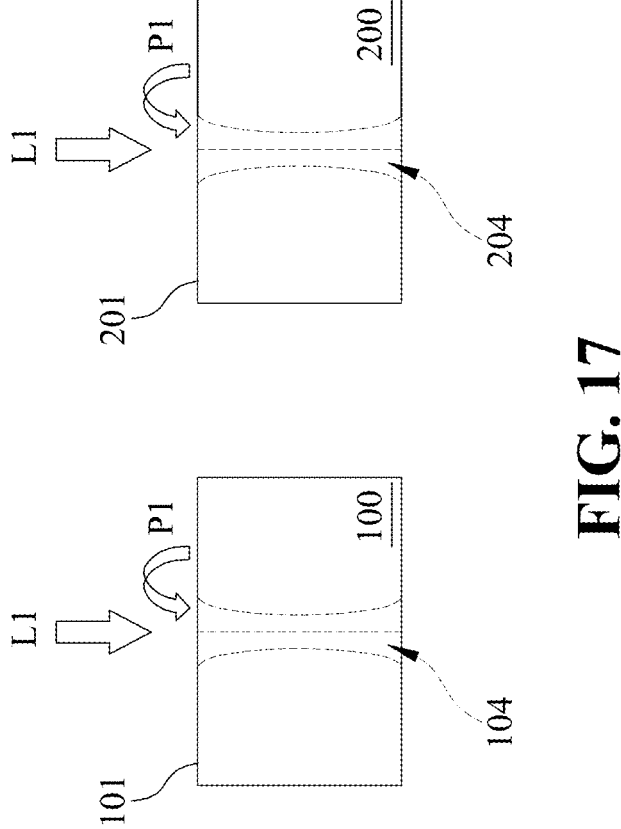
FIGS. 17 to 24 are schematic views of different process stages of the second embodiment of the glass metallization process for through glass vias with high aspect ratio according to the present invention.
Figure 18:
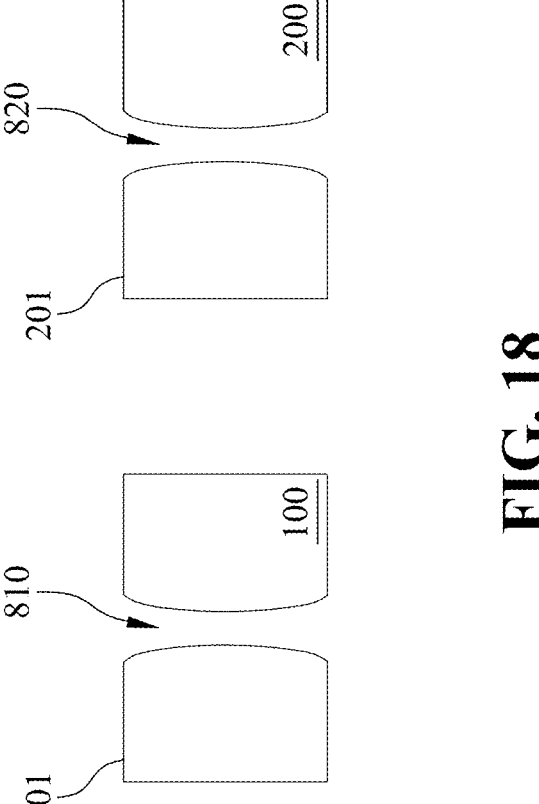

Refer to FIG. 16 and FIG. 17 to FIG. 24. The glass metallization process S200 for through glass vias with high aspect ratio according to the second embodiment of the present invention includes the following steps:

Step S210 is a drilling step, that is, forming at least one first via to penetrate a first glass substrate and forming at least one second via to penetrate a second glass substrate. In some embodiments, as shown in FIG. 18, at least one first via 810 is formed to penetrate the first glass substrate 100 and at least one second via 820 is formed to penetrate the second glass substrate 200. In some embodiments, the number of the first via 810 and the second via 820 may be one or more. The embodiment of the present invention takes a single first via 801 and a single second via 820 as an example to illustrate. In some embodiments, the drilling step (i.e., step S210) may include: vertically incident on the first glass substrate and the second glass substrate with a laser beam to perform structural modification to form a first pre-processing area (also known as the first modified area) and a second pre-processing area (also known as the second modified area); and an etching process is performed in the first pre-processing area and the second pre-processing area respectively to form the first via and the second via. In some embodiments, as shown in FIG. 17, the laser beam L1 is vertically incident on the first glass substrate 100 and the second glass substrate 200 for structural modification to form the first pre-processing area 104 and the second pre-processing area 204. In some embodiments, as shown in FIG. 18, the etching process P1 is performed in the first pre-processing area 104 and the second pre-processing area 204 to form the first via 810 and the second via 820 respectively.

In some embodiments, the etching process P1 may be a dry etching process, a wet etching process, or a combination thereof. If the etching process P1 is a wet etching process, it can be realized through hydrofluoric acid (HF). In some embodiments, an aspect ratio of the via 500 may range from 5:1 to 25:1. In some embodiments, the via 500 may have a diameter ranging from 20 μm to 150 μm.

Figure 19:
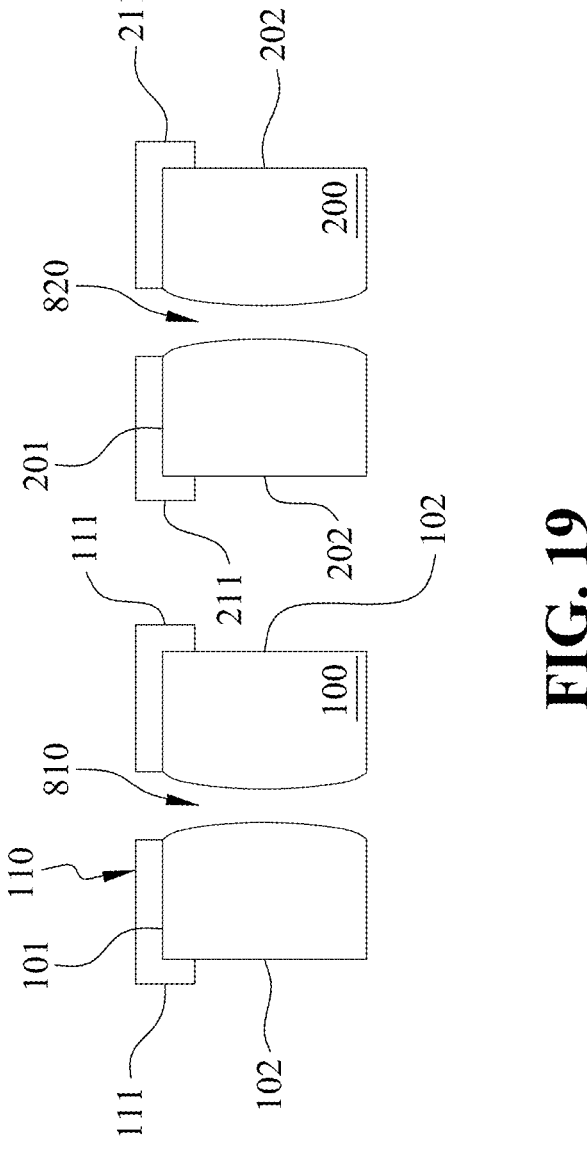

Step S220 is a single-sided coating step, that is, forming a first seed layer on a surface of the first glass substrate without covering the at least one first via; and forming a second seed layer on a surface of the second glass substrate without covering the at least one second via. In some embodiments, as shown in FIG. 19, the first seed layer 110 is formed over the surface 101 (e.g., the upper surface) of the first glass substrate 100 and not covering the first via 810, and the second seed layer 210 is formed on the surface 201 (e.g., the upper surface) of the second glass substrate 200 and not covering the second via 820. In some embodiments, the material of the first seed layer 110 and the second seed layer 210 may be copper (Cu) or silver (Ag), but is not limited thereto.

In some embodiments, the single-sided coating step (i.e., step S220) further includes: depositing a first extension part of the first seed layer partially covers each outer side wall of the first glass substrate, and depositing a second extension part of the second seed layer partially covers each outer side wall of the second glass substrate. In some embodiments, as shown in FIG. 19, the first extension part 111 of the first seed layer 110 partially covers each outer side wall 102 of the first glass substrate 100, and the second extension part 211 of the second seed layer 210 partially covers each outer side wall 202 of the second glass substrate 200. In some embodiments, the material of the first seed layer 110 and the second seed layer 210 may be copper (Cu) or silver (Ag), but is not limited thereto.

In some embodiments, the single-side coating step (i.e., step S220) is implemented through a sputtering process. That is, the first extending part 111 of the first seed layer 110 partially covers each outer side wall 102 of the first glass substrate 100 through a sputtering process, and the second extending part 211 of the second seed layer 210 partially covers each outer side wall 202 of the second glass substrate 200 through a sputtering process.

Figure 20:
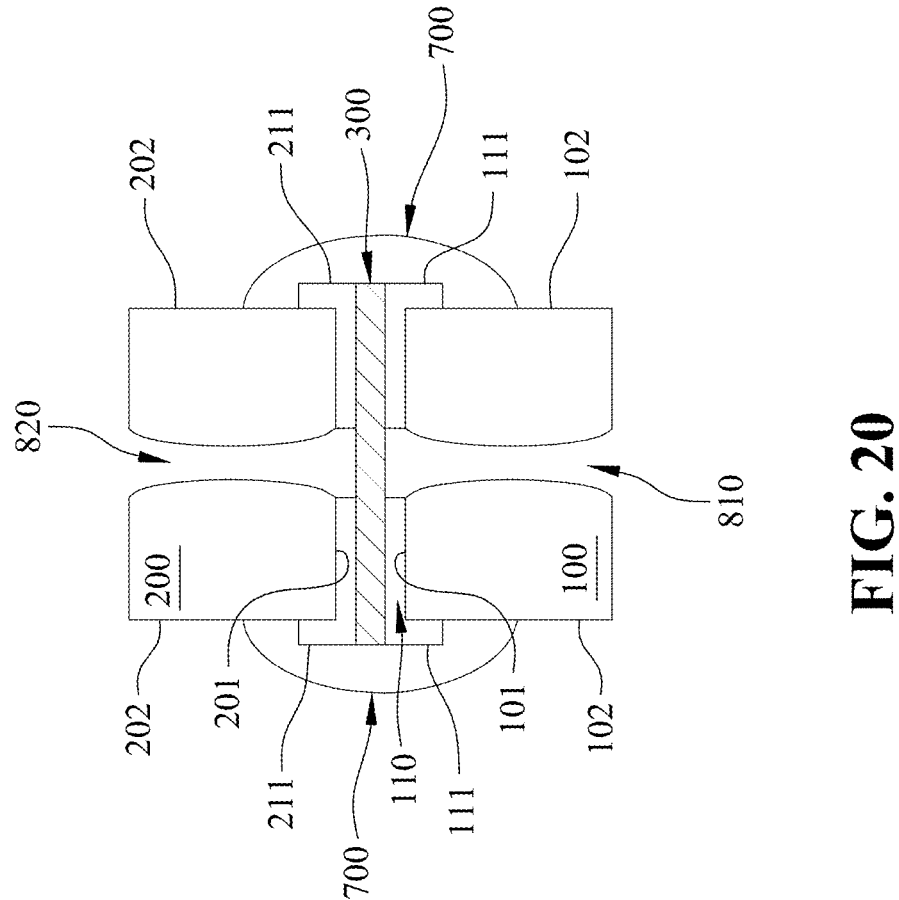

Step S230 is a bonding step, that is, turning over the second glass substrate and bonding with the first seed layer through a bonding layer. In some embodiments, as shown in FIG. 20, the second glass substrate 200 is turned over and the first seed layer 110 and the second seed layer 210 are bonded through the bonding layer 300. The bonding step (i.e., step 230) may include: forming the bonding layer over the first seed layer; and turning over the second glass substrate to bond the second seed layer over the bonding layer. In some embodiments, as shown in FIG. 20, the bonding layer 300 is formed on the first seed layer 110, and the second glass substrate 200 is turned over so that the second seed layer 210 is attached onto the bonding layer 300. In some embodiments, in the bonding step (i.e., step S230), at least one first via 810 may be disposed correspondingly to at least one second via 820 or aligned with each other. Alternatively, in some embodiments, in the bonding step (i.e., step S230), at least one first via 810 and at least one second via 820 may be staggered or misaligned with each other, but it is not limited thereto. In some embodiments, the bonding layer 300 in the bonding step (i.e., step S230) is formed on the first seed layer 110 through a sputtering process, but it is not limited thereto.

In some embodiments, the material of the bonding layer 300 may be an energy removable material, and the energy removable material at least includes a photonic decomposable material and a thermal decomposable material. In some embodiments, preferably, the bonding layer 300 can be an adhesive with weak lateral bonding, so that after the final via metallization is completed, the bonding layer 300 can be laterally destroyed through a tool (not shown) to be removed from the bonding layer 300, so that the first seed layer 110 of the first glass substrate 100 and the second seed layer 210 of the second glass substrate 200 can be peeled off from each other. Or, in other embodiments, the bonding layer 300 can be a low-melting-point metal, such as tin (melting point is about 260° C.). In this case, the first glass substrate 100 and the second glass substrate 200 can be bonded at 250° C. The bonded first glass substrate 100 and the second glass substrate 200 may also be peeled off at 250° C. In some embodiments, when the bonding layer 300 is a low-melting-point metal, the melting point of the low-melting-point metal may be lower than 350° C.

Figure 21:
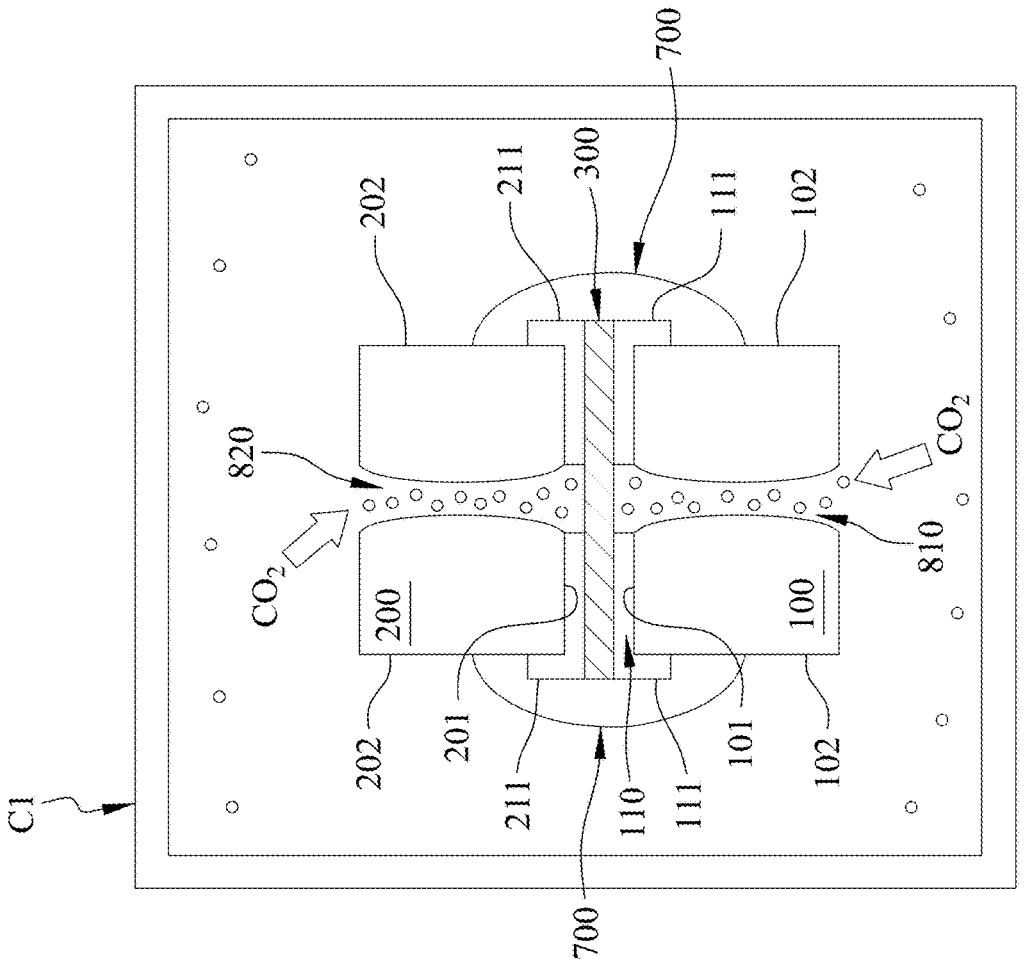
Figure 22:
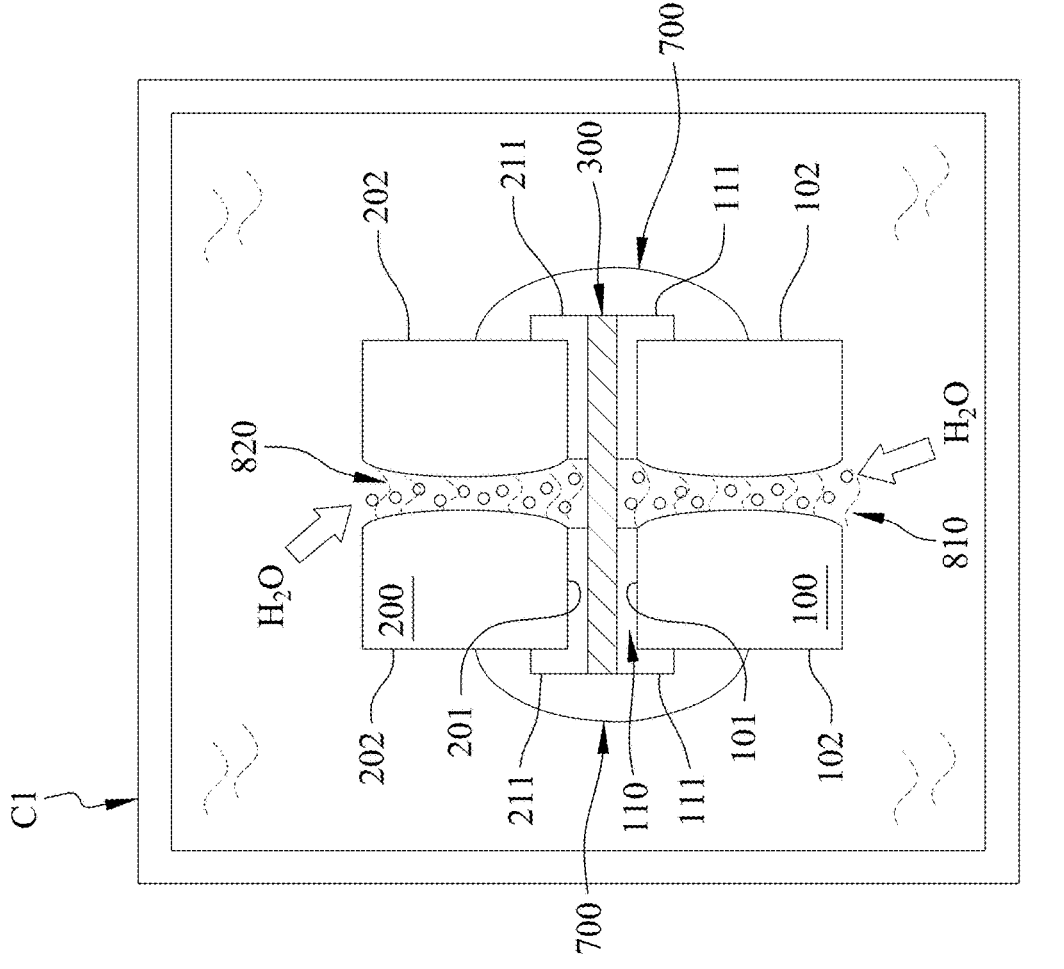

Step S240 is a pre-lubricating step, that is, performing a pre-lubricating process on the first glass substrate, the first seed layer, the bonding layer, the second seed layer and the second glass plate. In some embodiments, as shown in FIGS. 21 and 22, the pre-lubricating process includes: placing the first glass substrate, the first seed layer, the bonding layer, the second seed layer, and the second glass substrate into a holding tank; carbon dioxide is the introduced into the holding tank so that a so that the at least one first via and the at least one second via are filled with carbon dioxide; and then water is introduced into the holding tank, wherein the water reacts with carbon dioxide to produce carbonic acid, so that the so that the at least one first via and the at least one second via are filled with c carbonic acid. That is, each wall surface of the first glass substrate, the first seed layer, the bonding layer, the second seed layer, and the second glass substrate at the at least one first via and the at least one second via becomes wet. In some embodiments, as shown in FIG. 21, the pre-lubricating process includes placing the first glass substrate 100, the first seed layer 110, the bonding layer 300, the second seed layer 210, and the second glass substrate 200 into a holding tank C1, and carbon dioxide (i.e., $CO_2$) is introduced into the holding tank C1, so that the via 500 is filled with carbon dioxide. In some embodiments, as shown in FIG. 22, water (i.e., $H_2O$) is introduced into the holding tank C1, wherein the water reacts with carbon dioxide to produce carbonic acid (i.e., $H_2CO_3$). The walls of the first glass substrate 100, the first seed layer 110, the bonding layer 300, the second seed layer 210, and the second glass substrate 200 at the at least one first via 810 and the at least one second via 820 are made moist, thereby facilitating the growth of the metal material in the subsequent electroplating process.

Figure 23:
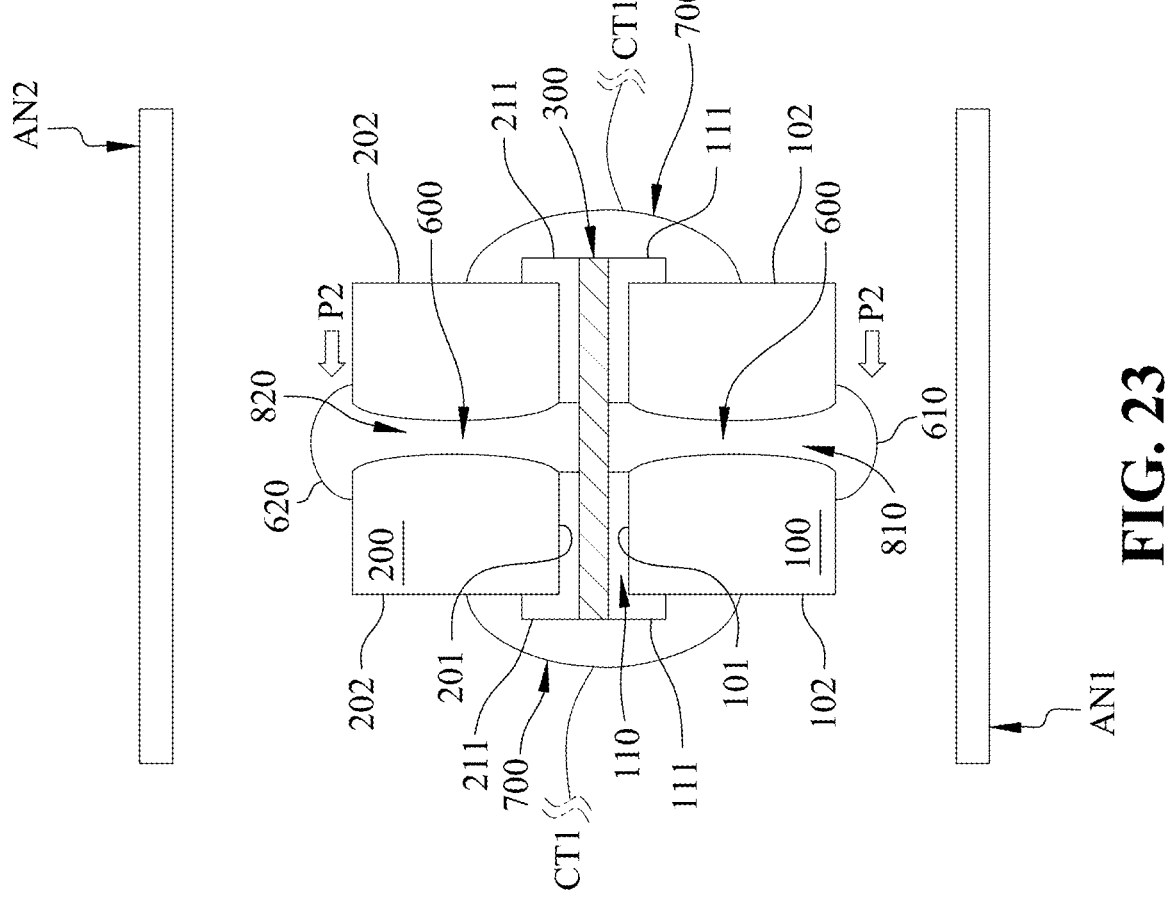
Figure 24:
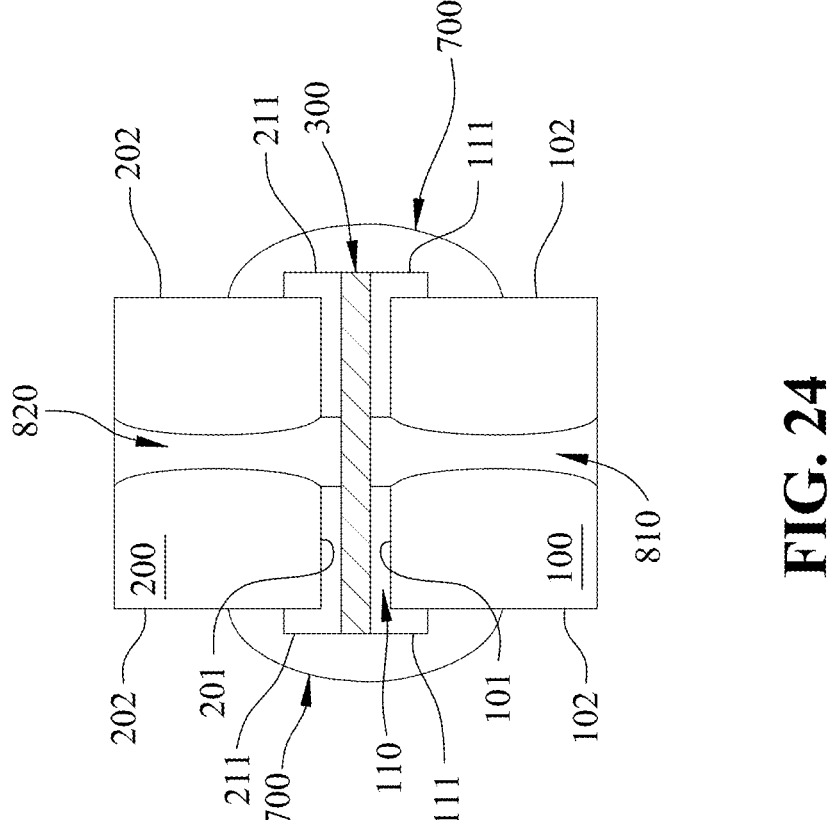

Step S250 is a metallization process, that is, using a metal material to perform an electroplating process, so that the metal material grows from the at least one first via adjacent to the first seed layer toward a surface of the first glass substrate opposite to the first seed layer to completely fill the at least one first via, and at the same time, the metal material grows from the at least one second via adjacent to the second seed layer toward a surface of the second glass substrate opposite to the second seed layer to completely fill the at least one second via. In some embodiments, as shown in FIGS. 23 and 24, a metal material 600 is used to perform an electroplating process, so that the metal material 600 grows from the first via 801 adjacent to the first seed layer 110 toward the surface 103 (e.g., lower surface) of the first glass substrate 100 opposite to the first seed layer 110 to completely fill the first via 801 while simultaneously causing the metal material 600 to grow from the second via 802 adjacent to the second seed layer 210 toward the surface 203 (e.g., lower surface) of the second glass substrate 200 opposite to the second seed layer 210 to completely fill the second via hole 802.

The metallization step (i.e., step S250), after performing the electroplating process, further includes: the metal material forms a first bump on the surface of the first glass substrate opposite to the first seed layer, and the metal material forms a second bump on the surface of the second glass substrate opposite to the second seed layer; and a planarization process is performed to remove the first bump and the second bump. That is, in some embodiments, as shown in FIG. 23, the metal material 600 forms the first bumps 610 on the surface 103 (e.g., lower surface) of the first glass substrate 100 opposite to the first seed layer 110, and the metal material 600 forms the second bump 620 opposite to the surface 203 (e.g., lower surface) of the second seed layer 210; and the first bump 610 and the second bump 620 are removed by performing a planarization process P2. In some embodiments, the planarization process P2 includes a grinding process or a polishing process. In some embodiments, preferably, the planarization process P2 includes a chemical-mechanical polishing process.

In some embodiments, in order to enable the cathode CT1 of the electroplating equipment (not shown) to electrically connect the first seed layer 110 and the second seed layer 210 at the same time, the bonding step (i.e., step S230) may also include: forming a conductive layer to cover the first extension part and the second extension part. In some embodiments, the conductive layer 700 is formed to cover the first extension part 111 and the second extension part 211. That is, the cathode CT1 of the electroplating equipment (not shown) can penetrate the conductive layer 700 and electrically connect the first seed layer 110 and the second seed layer 210 at the same time. In some embodiments, the conductive layer 700 may be made of copper glue, but is not limited thereto.

Finally, if the bonding layer 300 is an energy-removable material, a beam with energy, such as light, heat or other energy, can be used to irradiate the bonding layer 300 to decompose the bonding layer 300 so that the first glass substrate 100 and the second glass substrates 200 can be peeled off from each other; or, if the bonding layer 300 is an adhesive with weak lateral bonding, a tool (not shown) can be used to destroy the bonding layer 300 from the side, so that the first glass substrate 100 can be peeled off from the second glass substrate 200.

Through the aforementioned metallization processing processes S100 and S200 for through glass vias with high aspect ratio, each wall surface of the first glass substrate 100, the first seed layer 210, the bonding layer 300, the second seed layer 210, and the second glass substrate 200 at the via 500 or the first via 810 and the second via 820 undergoes a pre-lubricating process to facilitate the growth of the metal material 600 during the electroplating process; and, for the through glass vias with high aspect ratio in the metallization process S100, the metal material 600 grows from the first seed layer 110 at the center 530 of the via 500 toward the surface 103 of the first glass substrate 100 opposite to the first seed layer 110 to fill the lower part 520 and the center 530 of the via 500, and at the same time, the metal material 600 grows from the second seed layer 210 at the center 530 of the via 500 toward the surface 203 of the second glass substrate 200 opposite to the second seed layer 210 to fill the upper part 510 and the center 530 of the via 500; or, for the through glass vias with high aspect ratio in the glass metallization process S200, the metal material 600 grows from the first via 801 adjacent to the first seed layer 110 towards the surface 103 (e.g., lower surface) of the first glass substrate 100 opposite to the first seed layer 110 to completely fill the first via 801 while the metal material 600 simultaneously grows from the second via 802 adjacent to the second seed layer 210 toward the surface 203 (e.g., lower surface) of the second glass substrate 200 opposite to the second seed layer 210 to completely fill the second via 802. Therefore, the metal material 600 can completely fill the via 500, or the first via 810 and the second via 820, and can be applied to the via 500, or the first via 810 and the second via 820 with a larger aspect ratio, without producing air gaps like the conventional method, thereby making the electroplating process simpler and improving the electroplating yield.

In addition, since a stack of two glass substrates (i.e., the first glass substrate 100 and the second glass substrate 200) is used, the support of the overall structure can be increased and the breakage of individual glass substrates can be avoided to affect the yield.

Furthermore, in the conventional technology (as shown in FIGS. 1 to 6), the current density used by the electroplating equipment (not shown) can only reach 0.1 ASD (ampere/square meter), that is, a thickness of 0.02 μm can be electroplated per minute; and with the glass metallization processing process S100 and S200 for the through-glass via with high aspect ratio of the present invention, the current density used by the electroplating equipment can reach 20 ASD, that is, 4 μm can be electroplated per minute. Therefore, compared with the conventional technology, the electroplating speed of the glass metallization processes S100 and S200 for through glass via with high aspect ratio of the present invention can be increased by at least 200 times, and the production speed is accelerated. Moreover, if the glass metallization process S200 for through glass via with high aspect ratio of the present invention is used, two glass substrates are stacked for production and then used together with electroplating equipment that has two sets of anodes for electroplating, which can achieve simultaneous fabricate two metallized glass substrates with through-glass vias (TGVs) to increase productivity.

Moreover, since the metal material 600 grows upward and downward respectively from the center 530 of the via 500 (for example, the glass metallization process S100 of the through glass via with high aspect ratio), or from the lamination layer 300 grows in the direction of the first via 801 and the second via 802 respectively (for example, the glass metallization process S200 of the through glass via with high aspect ratio), instead of growing on the surface of the glass substrate as in the conventional technology; therefore, there will be no problem of individual glass substrates being cracked or damaged due to different thermal expansion coefficients, thereby improving yield.

Although the present invention has been described with reference to the preferred embodiments thereof, it is apparent to those skilled in the art that a variety of modifications and changes may be made without departing from the scope of the present invention which is intended to be defined by the appended claims.

What is claimed is:

1. A glass metallization process for through glass vias with high aspect ratio, comprising:
   a single-sided coating step: forming a first seed layer on a surface of a first glass substrate and forming a second seed layer on a surface of a second glass substrate;
   a bonding step: turning over the second glass substrate and bonding the first seed layer and the second seed layer through a bonding layer;

a drilling step: forming at least one via to penetrate the second glass substrate, the second seed layer, the bonding layer, the first seed layer, and the first glass substrate;
   a pre-lubricating step: performing a pre-lubricating process on the first glass substrate, the first seed layer, the bonding layer, the second seed layer and the second glass substrate; and
   a metallization step: using a metal material to perform an electroplating process, so that the metal material grows from the first seed layer at a center of the at least one via toward a surface of the first glass substrate opposite to the first seed layer to fill a lower part of the at least one via and the center, and at the same time, the metal material grows from the second seed layer at the center of the at least one via toward a surface of the second glass substrate opposite to the second seed layer to fill an upper part of the at least one via and the center;
   wherein the upper part corresponds to the second glass substrate, the lower part corresponds to the first glass substrate, and the center corresponds to the second seed layer, the bonding layer and the first seed layer.

2. The glass metallization process for through glass vias with high aspect ratio according to claim 1, wherein the pre-lubricating process in the pre-lubricating step includes placing the first glass substrate, the first seed layer, the bonding layer, the second seed layer and the second glass substrate simultaneously into a holding tank; introducing carbon dioxide the holding tank to fill the at least one via with carbon dioxide; and introducing water liquid into the holding tank, wherein the water liquid reacts with carbon dioxide to produce carbonic acid, so that the at least one via is filled with carbon dioxide and the first glass substrate, the first seed layer, the bonding layer, the second seed layer and the second glass substrate become wet on each wall surface of the at least one via.

3. The glass metallization process for through glass vias with high aspect ratio according to claim 1, wherein the single-sided coating step further includes: depositing a first extension part of the first seed layer partially covering each outer side wall of the first glass substrate, and depositing a second extension part of the second seed layer partially covering each outer side wall of the second glass substrate.

4. The glass metallization process for through glass vias with high aspect ratio according to claim 3, wherein the bonding step further includes forming a conductive layer to cover the first extension part and the second extension part.

5. The glass metallization process for through glass vias with high aspect ratio according to claim 1, wherein the material of the first seed layer and the second seed layer is copper (Cu) or silver (Ag).

6. The glass metallization process for through glass vias with high aspect ratio according to claim 1, wherein the material of the bonding layer is an energy-removable material, and the energy-removable material at least includes a photonic decomposable material and a thermal decomposable material.

7. The glass metallization process for through glass vias with high aspect ratio according to claim 1, wherein the bonding layer is an adhesive with weak lateral bonding, or a low-melting-point metal, wherein the low-melting-point metal has a melting point lower than 350° C.

8. The glass metallization process for through glass vias with high aspect ratio according to claim 1, wherein an aspect ratio of the at least one via is between 5:1 and 25:1.

9. The glass metallization process for through glass vias with high aspect ratio according to claim 1, wherein a diameter of the at least one via is between 20 μm and 150 μm.

10. The glass metallization process for through glass vias with high aspect ratio according to claim 1, wherein in the metallization step, after performing the electroplating process, the metal material forms a first bump on the surface of the first glass substrate opposite to the first seed layer, and the metal material forms a second bump on the surface of the second glass substrate opposite to the second seed layer; and a planarization process is performed to remove the first bump and the second bump.

11. The glass metallization process for through glass vias with high aspect ratio according to claim 10, wherein the planarization process includes a grinding process or a polishing process.

12. The glass metallization process for through glass vias with high aspect ratio according to claim 10, wherein the planarization process includes a chemical-mechanical polishing process.

13. The glass metallization process for through glass vias with high aspect ratio according to claim 1, wherein the single-sided coating step is implemented through a sputtering process.

14. The glass metallization process for through glass vias with high aspect ratio according to claim 1, wherein the bonding layer in the bonding step is formed over the first seed layer through a sputtering process.

15. The glass metallization process for through glass vias with high aspect ratio according to claim 1, wherein the drilling step includes: using a laser beam to vertically illuminate the second glass substrate, the second seed layer, the bonding layer, the first seed layer and the first glass in sequence; the substrate is modified to form a pre-processing area; and an etching process is performed in the pre-processing area to form the at least one via.

16. The glass metallization process for through glass vias with high aspect ratio according to claim 1, wherein the bonding step includes: forming the bonding layer on the first seed layer; and flipping the second glass substrate to bond the second seed layer on the bonding layer.

17. A glass metallization process for through glass vias with high aspect ratio, comprising:
a drilling step: forming at least one first via to penetrate a first glass substrate, and forming at least one second via to penetrate a second glass substrate;
a single-sided coating step: forming a first seed layer on a surface of the first glass substrate without covering the at least one first via; and forming a second seed layer on a surface of the second glass substrate without covering the at least one second via;
a bonding step: turning over the second glass substrate and bonding with the first seed layer through a bonding layer;
a pre-lubricating step: performing a pre-lubricating process on the first glass substrate, the first seed layer, the bonding layer, the second seed layer, and the second glass plate; and
a metallization process: using a metal material to perform an electroplating process, so that the metal material grows from the at least one first via adjacent to the first seed layer toward a surface of the first glass substrate opposite to the first seed layer to completely fill the at least one first via, and at the same time, the metal material grows from the at least one second via adjacent to the second seed layer toward a surface of the second glass substrate opposite to the second seed layer to completely fill the at least one second via.

18. The glass metallization process for through glass vias with high aspect ratio according to claim 17, wherein the pre-lubricating process in the pre-lubricating step includes placing the first glass substrate, the first seed layer, the bonding layer, the second seed layer, and the second glass substrate simultaneously into a holding tank; introducing carbon dioxide into the holding tank so that the at least one first via and the at least one second via are filled with carbon dioxide; and introducing water into the holding tank, wherein the water reacts with carbon dioxide to generate carbonic acid, so that the first glass substrate, the first seed layer, the bonding layer, the second seed layer, and the second glass substrate become wet on each wall surface of the at least one first via and the at least one second via.

19. The glass metallization process for through glass vias with high aspect ratio according to claim 17, wherein the single-sided coating step further includes: depositing a first extension part of the first seed layer partially covering each outer side wall of the first glass substrate, and depositing a second extension part of the second seed layer partially covering each outer side wall of the second glass substrate.

20. The glass metallization process for through glass vias with high aspect ratio according to claim 19, wherein the bonding step further includes forming a conductive layer to cover the first extension part and the second extension part.

21. The glass metallization process for through glass vias with high aspect ratio according to claim 17, wherein the material of the first seed layer and the second seed layer is copper (Cu) or silver (Ag).

22. The glass metallization process for through glass vias with high aspect ratio according to claim 17, wherein the material of the bonding layer is an energy-removable material, and the energy-removable material at least includes a photonic decomposable material and a thermal decomposable material.

23. The glass metallization process for through glass vias with high aspect ratio according to claim 17, wherein the bonding layer is an adhesive with weak lateral bonding, or a low-melting-point metal, wherein the low-melting-point metal has a melting point lower than 350° C.

24. The glass metallization process for through glass vias with high aspect ratio according to claim 17, wherein an aspect ratio of the at least one first via and the at least one second via is between 5:1 and 25:1.

25. The glass metallization process for through glass vias with high aspect ratio according to claim 17, wherein a diameter of the at least one first via and the at least one second via is between 20 μm and 150 μm.

26. The glass metallization process for through glass vias with high aspect ratio according to claim 17, wherein the single-sided coating step is implemented through a sputtering process.

27. The glass metallization process for through glass vias with high aspect ratio according to claim 17, wherein the bonding layer in the bonding step is formed over the first seed layer through a sputtering process.

28. The glass metallization process for through glass vias with high aspect ratio according to claim 17, wherein the drilling step includes: using a laser beam to vertically illuminate the first glass substrate and the second glass substrate respectively to modify the glass substrates to form at least one first pre-processing area and at least one second pre-processing area; and performing an etching process in the at least one first pre-processing area and the at least one second pre-processing area respectively to form the at least one first via and the at least one second via.

29. The glass metallization process for through glass vias with high aspect ratio according to claim 17, wherein the bonding step includes: forming the bonding layer on the first seed layer; and turning the second glass substrate over to bond the second seed layer on the bonding layer.

30. The glass metallization process for through glass vias with high aspect ratio according to claim 17, wherein in the metallization step, after performing the electroplating process, the metal material forms a first bump on the surface of the first glass substrate opposite to the first seed layer, and the metal material forms a second bump on the surface of the second glass substrate opposite to the second seed layer; and a planarization process is performed to remove the first bump and the second bump.

31. The glass metallization process for through glass vias with high aspect ratio according to claim 30, wherein the planarization process includes a grinding process or a polishing process.

32. The glass metallization process for through glass vias with high aspect ratio according to claim 30, wherein the planarization process includes a chemical-mechanical polishing process.

33. The glass metallization process for through glass vias with high aspect ratio according to claim 17, wherein in the bonding step, the at least one first via is arranged correspondingly to match the at least one second via.

* * * * *